W. R. WAKEFIELD.
GRINDING MACHINE.
APPLICATION FILED AUG. 9, 1910.
988,841.
Patented Apr. 4, 1911.
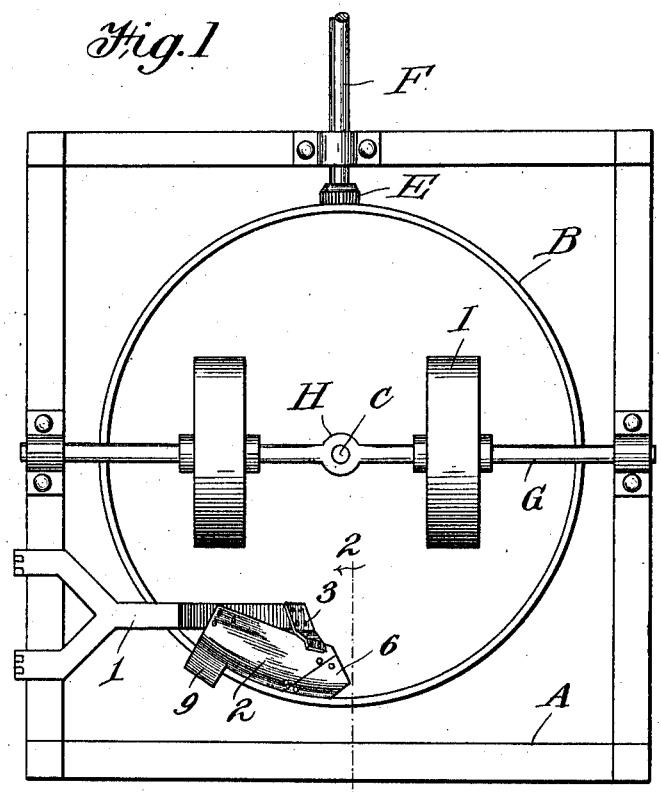
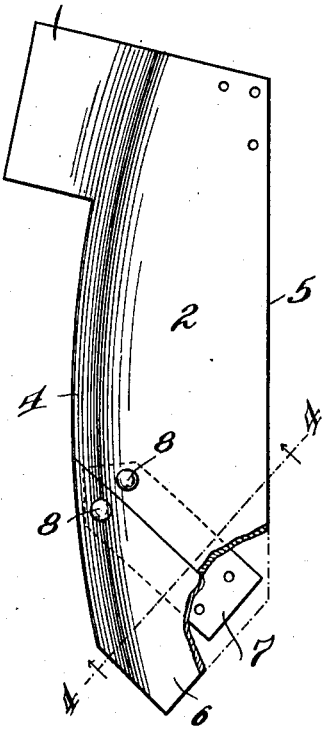
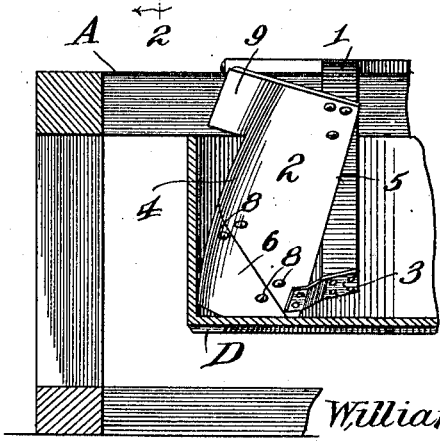
Inventor
William R. Wakefield
Witnesses
By Victor J. Evans
Attorney

UNITED STATES PATENT OFFICE.

WILLIAM R. WAKEFIELD, OF MOUNT UNION, PENNSYLVANIA.

GRINDING-MACHINE.

988,841.  Specification of Letters Patent.  Patented Apr. 4, 1911.

Application filed August 9, 1910.  Serial No. 576,304.

*To all whom it may concern:*

Be it known that I, WILLIAM R. WAKEFIELD, a citizen of the United States of America, residing at Mount Union, in the county of Huntingdon and State of Pennsylvania, have invented new and useful Improvements in Grinding-Machines, of which the following is a specification.

This invention relates to grinding and mixing machines of that class in which a pan or basin is supported for rotation about a vertical axis, suitably supported grinding rollers being employed to operate upon the contents of the pan.

The invention has for its object to produce a scraping device of simple and improved construction which may be conveniently utilized in connection with the revolving pan for the purpose of removing the contents of the latter by scooping it over the edge of the pan.

In the drawing, Figure 1 is a top plan view of a grinding and mixing machine constructed in accordance with the invention. Fig. 2 is a sectional detail view taken on the plane indicated by the line 2—2 in Fig. 1. Fig. 3 is a plan view of the plow or scraper detached, a portion having been broken away. Fig. 4 is a sectional detail view taken on the plane indicated by the line 4—4 in Fig. 3.

Corresponding parts in the several figures are denoted by like characters of reference.

The frame A of the improved machine is arranged to support the revolving pan B which is mounted to rotate about a centrally disposed shaft or post C. The bottom of the pan may be provided with a spur gear D meshing with a pinion E upon a driven shaft. A cross bar or shaft G supported upon the frame A and having an eye H engaging the post C supports the rollers or chasers I which are in engagement with the bottom of the pan so that as the latter is rotated, material, such as clay or the like, placed in the pan will be ground and disintegrated.

Hingedly supported upon one side of the frame A is an arm 1 carrying a scraping member known as a plow 2 which is reinforced by a brace 3, whereby it is held in proper position. Said plow consists of a blade having a curved upturned edge 4 adapted to engage the inner face of the side wall of the pan B. The opposite edge of the blade is straight, as shown at 5. A scraper 6 of hardened steel is connected by means of a connecting plate 7 and fastening members 8 with the lower edge of the blade 2, said scraper being adapted to engage the bottom of the pan and the corner formed by the intersection of the bottom and the side wall. Adjacent to its upper end the blade 2 is provided with an outwardly extending lug or flange 9 adapted to overlap or overhang the upper edge of the side wall of the pan B.

In the operation of this device, the hinged arm may normally be raised or moved to a position in which the plow shall be disengaged from or raised above the pan. When it shall be desired to scoop out the contents of the pan, the plow is lowered to the position shown in Figs. 1 and 2, and the contents of the pan which is thrown by centrifugal action in the direction of the side wall will now be forced to slide upwardly upon the inclined plane of the plow blade, being eventually discharged over the overhanging flange 9. A suitable receptacle may be placed in proper position to receive the material as it is being discharged.

As will be seen from the foregoing description, taken in connection with the drawing hereto annexed, the improved device is simple in construction, as well as thoroughly efficient in operation, it being possible very quickly and conveniently to move the plow or the scraper to an operative or an inoperative position, as the case may be. The construction of the scraper or plow is simple and efficient, and the part which is exposed to wear may be readily detached and renewed at a trifling expense.

Having thus described the invention, what is claimed as new, is:—

In a grinding and mixing machine, the combination of a pan supported for rotation in an approximately horizontal plane and having vertical side walls, a frame, an arm hingedly connected with the frame, and a member connected with said arm and adapted to engage the pan to scrape and discharge material therefrom, said member including a blade having a curved upturned outer edge adapted to engage and to lie snugly against the inner face of the side wall of the pan, a flange at the upper end of said blade adapted to overhang the upper edge of the side wall of the pan, and a scraping member detachably connected with the blade adjacent to the lower end of the latter, said scraping member being of angular shape and having two edges adapted to engage, respectively, the bottom and the side wall of the revolving pan.

In testimony whereof I affix my signature in presence of two witnesses.

WILLIAM R. WAKEFIELD.

Witnesses:
FRANK H. HARRISON,
H. W. HARRISON.

Copies of this patent may be obtained for five cents each, by addressing the "Commissioner of Patents, Washington, D. C."